(12) United States Patent
Archer

(10) Patent No.: US 8,701,043 B2
(45) Date of Patent: Apr. 15, 2014

(54) METHODS AND SYSTEMS FOR DYNAMICALLY PROVIDING ACCESS TO ENHANCED CONTENT DURING A PRESENTATION OF A MEDIA CONTENT INSTANCE

(75) Inventor: Don G. Archer, Euless, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 243 days.

(21) Appl. No.: 12/869,292

(22) Filed: Aug. 26, 2010

(65) Prior Publication Data

US 2012/0054610 A1    Mar. 1, 2012

(51) Int. Cl.
*G06F 3/048* (2013.01)

(52) U.S. Cl.
USPC .................... 715/811; 715/716; 348/465

(58) Field of Classification Search
USPC .......................................... 348/465
See application file for complete search history.

(56) References Cited

U.S. PATENT DOCUMENTS

| | | | | |
|---|---|---|---|---|
| 5,813,014 | A * | 9/1998 | Gustman | 1/1 |
| 6,199,060 | B1 * | 3/2001 | Gustman | 1/1 |
| 7,603,683 | B2 * | 10/2009 | Reto | 725/34 |
| 2002/0144273 | A1 * | 10/2002 | Reto | 725/86 |
| 2004/0078814 | A1 * | 4/2004 | Allen | 725/47 |
| 2008/0204595 | A1 * | 8/2008 | Rathod et al. | 348/465 |
| 2008/0313146 | A1 * | 12/2008 | Wong et al. | 707/3 |
| 2009/0172544 | A1 * | 7/2009 | Tsui et al. | 715/721 |
| 2009/0177301 | A1 * | 7/2009 | Hayes | 700/94 |
| 2011/0067099 | A1 * | 3/2011 | Barton et al. | 726/21 |
| 2011/0078628 | A1 * | 3/2011 | Rosenberg | 715/811 |

* cited by examiner

*Primary Examiner* — William Titcomb

(57) ABSTRACT

Exemplary methods and systems for dynamically providing access to enhanced content during a presentation of a media content instance are disclosed herein. An exemplary method includes an enhanced content access system detecting a presentation of a media content instance, analyzing a stream of text associated with the media content instance to obtain one or more keywords each corresponding to at least one of a plurality of portions of the media content instance, selecting one or more enhanced content instances associated with the media content instance in accordance with the one or more keywords, and dynamically displaying one or more display elements each representative of an enhanced content instance included in the one or more enhanced content instances in a graphical user interface during the presentation of the media content instance. Corresponding methods and systems are also disclosed.

25 Claims, 11 Drawing Sheets

METHODS AND SYSTEMS FOR DYNAMICALLY PROVIDING ACCESS TO ENHANCED CONTENT DURING A PRESENTATION OF A MEDIA CONTENT INSTANCE

BACKGROUND INFORMATION

Advances in electronic communications technologies have interconnected people and allowed for distribution of information perhaps better than ever before. To illustrate, personal computers, handheld devices, mobile phones, set-top box devices, and other electronic access devices are increasingly being used to access, store, download, share, and/or otherwise process various types of media content (e.g., video, audio, photographs, and/or multimedia).

Many users of such access devices would be interested in accessing enhanced content associated with a media content instance while the media content instance is being presented by way of one of the above-mentioned access devices if given the opportunity to do so. For example, many users would enjoy accessing additional information associated with a particular scene in a television program, purchasing items similar to those included in the television program, and/or discovering additional media content featuring various characters included in the television program while the television program is being presented. In current implementations, the user must provide substantial user input (e.g., enter one or more keywords into a search engine, navigate to a website associated with the media content instance, etc.) in order to access such enhanced content. This is cumbersome, distracting, and difficult to perform for many users while they watch or otherwise experience the media content instance. Hence, many users do not even attempt to access enhanced content associated with a media content instance while the media content instance is being presented.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers may designate identical or similar elements.

DETAILED DESCRIPTION OF PREFERRED EMBODIMENTS

Figure 1:
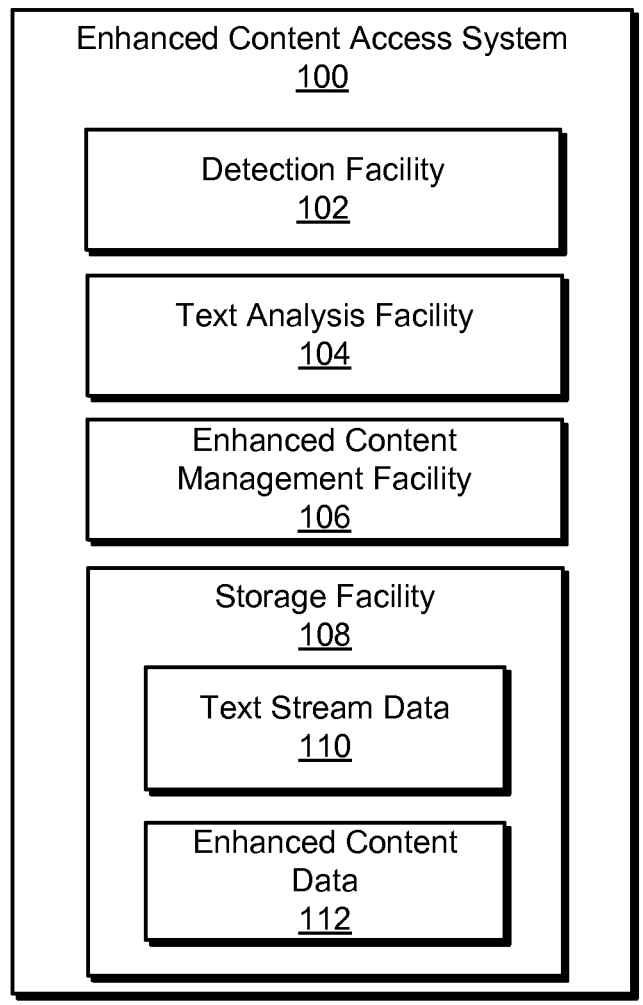
FIG. 1 illustrates an exemplary enhanced content access system according to principles described herein.

Exemplary methods and systems for dynamically providing access to enhanced content during a presentation of a media content instance are disclosed herein. As described in more detail below, an enhanced content access system may detect a presentation of a media content instance for experiencing by a user, analyze a stream of text associated with the media content instance to obtain one or more keywords, select one or more enhanced content instances associated with the media content instance in accordance with the one or more keywords, and dynamically display one or more display elements each representative of one of the one or more enhanced content instances in a graphical user interface during the presentation of the media content instance. In this or a similar manner, the exemplary systems and methods described herein may allow a user to access enhanced content related to a media content instance while the media content instance is being presented.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, image, photograph, sound, or any segment, component, or combination of these or other forms of media content that may be viewed or otherwise experienced by a user.

As used herein, the term "display element" refers to text (e.g., one or more words, characters, numbers, symbols, etc.), one or more images, one or more videos, one or more graphics, animation content (e.g., Flash content), one or more hyperlinks, and/or any other content that may be visually displayed in a graphical user interface and that may be representative of an enhanced content instance.

As used herein, the terms "enhanced content" and "enhanced content instance" may include any content related to a particular media content instance being presented. For example, an enhanced content instance may include, but is not limited to, an advertisement, a communication (e.g., a communication provided by way of a social media outlet), a video (e.g., a YouTube video), an article (e.g., an online newspaper article), music, a map, a web page, a web-based search results list (e.g., a Google search results list), and/or any other content as may serve a particular implementation.

Enhanced content instances may be obtained from one or more enhanced content sources. As used herein, the term "enhanced content source" may include any source from which one or more enhanced content instances may be obtained. For example, enhanced content sources may include, but are not limited to, social media sources (e.g., Facebook, Twitter, YouTube, blogs, etc.), media content sources (e.g., iTunes, Netflix, etc.), retail product sources (e.g., Wal-Mart, Borders, Amazon, etc.), advertisement sources, Internet search engines (e.g., Google, Bing, etc.), news sources (e.g., CNN, Wall Street Journal, etc.), and/or any other suitable enhanced content source.

Enhanced content instances may be categorized into one or more enhanced content categories. As used herein, the term "enhanced content category" may refer to any particular group or type of enhanced content instances. For example, a particular enhanced content category may be limited to a particular type of enhanced content, such as advertisements, news articles, social media, web pages, videos, or any other suitable type of enhanced content instances. Additionally or alternatively, a particular enhanced content category may be limited to enhanced content related to a particular topic, such as travel, sports, entertainment, politics, finances, education, or any other suitable topic to which one or more enhanced content instances may be related.

FIG. 1 illustrates an exemplary enhanced content access system 100 (or simply "system 100"). As will be described in more detail below, system 100 may be configured to facilitate access to enhanced content associated with a media content instance being presented for experiencing by a user.

System 100 may include, but is not limited to, a detection facility 102, a text analysis facility 104, an enhanced content management facility 106 (or simply "management facility 106"), and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

As will be described in more detail below, detection facility 102 may be configured to detect a presentation of a media content instance. For example, detection facility 102 may be configured to detect that a media content instance is being delivered to and/or presented by a media content access subsystem (e.g., a set-top box device, a personal computing device, etc.), that a previously recorded media content instance is being played back for presentation (e.g., by a digital video recording ("DVR") device, by a DVD player, etc.), or that a media content instance is being delivered and/or presented in any other suitable manner.

Text analysis facility 104 may be configured to analyze a stream of text associated with a media content instance to obtain one or more keywords. In some examples, each of the one or more keywords may correspond to at least one of a plurality of portions of the media content instance. The stream of text may be associated with the media content instance in any suitable manner. For example, the stream of text may include a closed caption stream associated with the media content instance. In some examples, the closed caption stream may include a transcription of an audio portion of the media content instance (e.g., a transcription of the speech and/or non-speech elements of the media content instance), with each portion of the transcription corresponding to a particular portion of the media content instance.

Text analysis facility 104 may be configured to receive the stream of text associated with the media content instance in any suitable manner and at any time prior to or concurrently with the presentation of the media content instance. In some examples, the stream of text may be received packaged with a stream of data representative of the media content instance. Additionally or alternatively, data representative of the stream of text may be stored or maintained along with or in addition to a recorded media content instance.

Text analysis facility 104 may analyze the received stream of text to obtain one or more keywords. Text analysis facility 104 may be configured to analyze the stream of text and obtain the one or more keywords in any suitable manner. For example, text analysis facility 104 may be configured to use one or more text analysis, text searching, and/or text mining methods or techniques to obtain the one or more keywords from the stream of text. In some examples, text analysis facility 104 may be configured to remove one or more words (e.g., noise words, stop words, numbers, etc.) from the stream of text to obtain the one or more keywords. Additionally or alternatively, text analysis facility 104 may be configured to analyze the stream of text to obtain the one or more keywords in real time during the presentation of the media content instance.

In some examples, the one or more keywords may be representative of a portion of a media content instance being presented. For example, the one or more keywords may represent a topic, a person or character, a scene, an event, a location, and/or any other suitable aspect of the portion of the media content instance being presented.

In additional or alternative examples, text analysis facility 104 may be user configurable. For example, a user may configure text analysis facility 104 to analyze streams of text and/or obtain keywords in accordance with the user's preferences. To illustrate, a user may configure text analysis facility 104 to obtain a particular type of keyword (e.g., words related to sporting events, words representing celebrity names, etc.) from a stream of text, remove a particular type of word (e.g., words related to a particular type of music, words related to politics, etc.), obtain keywords at a particular frequency, and/or perform any other suitable text analysis operation in accordance with the user's preferences.

Management facility 106 may be configured to select and/or provide a user with access to one or more enhanced content instances during the presentation of the media content instance. In some examples, management facility 106 may be configured to select one or more enhanced content instances associated with a media content instance being presented. For example, management facility 106 may be configured to select one or more enhanced content instances in accordance with the one or more keywords obtained by text analysis facility 104. To illustrate, management facility 106 may be configured to use the one or more keywords obtained by text analysis facility 104 to search one or more enhanced content sources for enhanced content instances including and/or associated with the one or more keywords. In some examples, management facility 106 may be configured to concurrently search a plurality of different enhanced content sources (e.g., using a plurality of parallel search threads) and aggregate enhanced content instances selected from the plurality of different enhanced content sources. Additionally or alternatively, management facility 106 may be configured to select the one or more enhanced content instances in real time as the one or more keywords are obtained by text analysis facility 104.

Management facility 106 may be further configured to dynamically display one or more display elements in a graphical user interface during a presentation of a media content instance. For example, management facility 104 may be configured to display one or more display elements each representative of one of the one or more enhanced content instances selected by management facility 106. In some examples, management facility 104 may be configured display the one or more display elements dynamically as the corresponding enhanced content instances are selected (e.g., as search results are obtained from the enhanced content sources). As a result, a user may be presented with a "stream" of display elements that may be constantly changing to display new display elements as new enhanced content instances are selected. For example, a new display element may move sequentially from a starting position within a graphical user interface to an ending position within the graphical user interface, after which it is removed from the graphical user interface. In additional or alternative examples, management facility 106 may be configured to display the one or more display elements in any other suitable manner or order (e.g., concurrently, in response to a presentation of a corresponding portion of the media content instance, etc.).

Additionally or alternatively, management facility 106 may be configured to dynamically replace one or more display elements with new display elements (e.g., display elements representative of newly selected enhanced content instances). To illustrate, management facility 106 may select a first enhanced content instance in accordance with a first keyword associated with a first portion of a media content instance and display a first display element representative of the first enhanced content instance within a graphical user interface during a time period associated with a presentation of the first portion of the media content instance. Thereafter, management facility 106 may select a second enhanced content instance in accordance with a second keyword associated with a second portion of a media content instance and replace the first display element with a second display element representative of the second enhanced content instance during a time period associated with a presentation of the second portion of the media content instance.

Additionally or alternatively, management facility 106 may provide a visual indication that a display element is being replaced. For example, management facility 106 may cause a display element to visually "flip" within the graphical user interface as it is replaced by a new display element, thereby indicating to the user that the display element has been replaced. In additional or alternative examples, management facility 106 may be configured to provide any other suitable visual indication of a replacement of a display element.

Management facility 106 may be configured to organize the one or more display elements within the graphical user interface in any suitable manner. For example, management facility 106 may be configured to organize the one or more display elements into one or more columns within the graphical user interface. In certain embodiments, each column of display elements within the graphical user interface may be associated with and/or limited to display elements representative of enhanced content instances from a particular enhanced content source or from a particular enhanced content category.

In some examples, management facility 106 may be configured to display the one or more display elements on a display separate from a display being used to present the media content instance. For example, management facility 106 may be configured to display the graphical user interface including the one or more display elements on a display screen of a mobile access device (e.g., a tablet computer, a mobile phone device, etc.) during the presentation of the media content instance by a set-top box device by way of another display screen (e.g., by way of a display screen of a television display device). Additionally or alternatively, management facility 106 may be configured to display the graphical user interface including the one or more display elements on a first display device (e.g., a first monitor) coupled to a computing device (e.g., a personal computer) during the presentation of the media content instance on a second display device (e.g., a second monitor) coupled to the same computing device.

Management facility 106 may be configured to display the one or more display elements during a time period associated with a presentation of a particular portion of the media content instance. For example, management facility 106 may be configured to display a particular display element representative of a particular enhanced content instance associated with a particular portion of the media content instance during a time period associated with a presentation of the particular portion of the media content instance. To illustrate, management facility 106 may be configured to display the particular display element concurrently with and/or for an amount of time following the presentation of the particular portion of the media content instance.

Management facility 106 may be further configured to provide a user with access to the one or more enhanced content instances. For example, in response to a selection by a user of a display element representative of a particular enhanced content instance, management facility 106 may be configured to provide the user with access to the particular enhanced content instance. In some examples, management facility 106 may be configured to include the particular enhanced content instance within the graphical user interface used to display the one or more display elements. Additionally or alternatively, management facility 106 may be configured to temporarily hide or minimize some or all of the one or more display elements while the particular enhanced content instance is being displayed.

In some examples, management facility 106 may be user configurable. For example, a user may configure management facility 106 to select enhanced content instances and/or display elements in accordance with the user's preferences. To illustrate, a user may configure which enhanced content sources management facility 106 searches for enhanced content instances, how management facility 106 organizes display elements within a graphical user interface, how often management facility 106 updates and/or replaces display elements within the graphical user interface, and/or any other operation of management facility 106.

Storage facility 108 may be configured to maintain text stream data 110 representative of one or more streams of text and enhanced content data 112 representative of one or more enhanced content instances. Storage facility 108 may be configured to maintain additional or alternative data as may serve a particular implementation.

Figure 2:
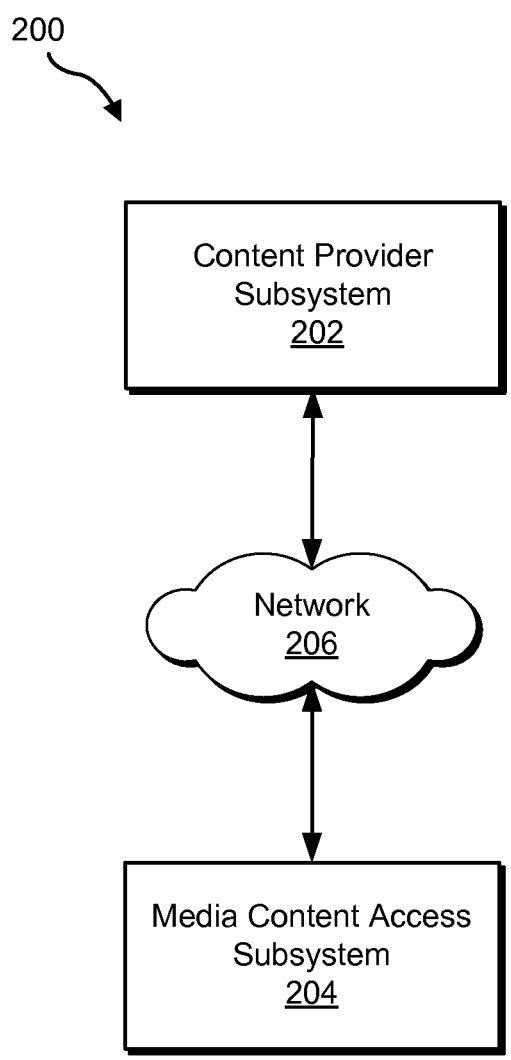
FIG. 2 illustrates an exemplary implementation of the system of FIG. 1 according to principles described herein.

FIG. 2 illustrates an exemplary implementation 200 of system 100 wherein a content provider subsystem 202 (or simply "provider subsystem 202") is communicatively coupled to a media content access subsystem 204 (or simply "access subsystem 204"). As will be described in more detail below, detection facility 102, text analysis facility 104, management facility 106, and storage facility 108 may each be implemented on one or both of provider subsystem 202 and access subsystem 204.

Provider subsystem 202 and access subsystem 204 may communicate using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

In certain embodiments, provider subsystem 202 and access subsystem 204 may communicate via a network 206, which may include one or more networks, including, but not limited to, wireless networks (Wi-Fi networks), (e.g., wireless communication networks), mobile telephone networks (e.g., cellular telephone networks), closed media networks, open media networks, closed communication networks, open communication networks, satellite networks, navigation networks, broadband networks, narrowband networks, voice communication networks (e.g., VoIP networks), the Internet, local area networks, and any other networks capable of carrying data and/or communications signals between provider subsystem 202 and access subsystem 204. Communications between provider subsystem 202 and access subsystem 204 may be transported using any one of the above-listed networks, or any combination or sub-combination of the above-listed networks.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection).

In some examples, provider subsystem 202 may be configured to generate or otherwise provide media content (e.g., in the form of one or more media content streams, one or more media content instances, etc.) to access subsystem 204. Provider subsystem 202 may additionally or alternatively be configured to provide enhanced content to access subsystem 204.

Access subsystem 204 may be configured to facilitate access by a user to media content received from provider subsystem 202. To this end, access subsystem 204 may present the media content for experiencing (e.g., viewing) by a user, record the media content, and/or analyze data associated with the media content (e.g., analyze a stream of text associated with the media content). Presentation of the media content may include, but is not limited to, displaying, playing, or otherwise presenting the media content, or one or more components of the media content, such that the media content may be experienced by the user.

Additionally or alternatively, access subsystem 204 may be configured to provide a user with access to enhanced content associated with media content being presented. For example, access subsystem 204 may be configured to display, within a graphical user interface, one or more display elements representative of one or more enhanced content instances associated with the media content instance during the presentation of the media content instance. In some examples, access subsystem 204 may display the one or more display elements and/or the corresponding enhanced content instances on a display separate from a display used to present the media content instance.

In certain embodiments, system 100 may be implemented entirely by or within provider subsystem 202 or access subsystem 204. In other embodiments, components of system 100 may be distributed across provider subsystem 202 and access subsystem 204. For example, access subsystem 204 may include a client (e.g., a client application) implementing one or more of the facilities of system 100.

Provider subsystem 202 may be implemented by one or more computing devices. For example, provider subsystem 202 may be implemented by one or more server devices. Additionally or alternatively, access subsystem 204 may be implemented as may suit a particular implementation. For example, access subsystem 204 may be implemented by one or more media content access devices, which may include, but are not limited to, a set-top box device, a DVR device, a media content processing device, a communications device, a mobile access device (e.g., a mobile phone device, a handheld device, a laptop computer, a tablet computer, a personal-digital assistant device, etc.), a personal computer, a gaming device, a television device, and/or any other device configured to perform one or more of the processes and/or operations described herein.

Figure 3:
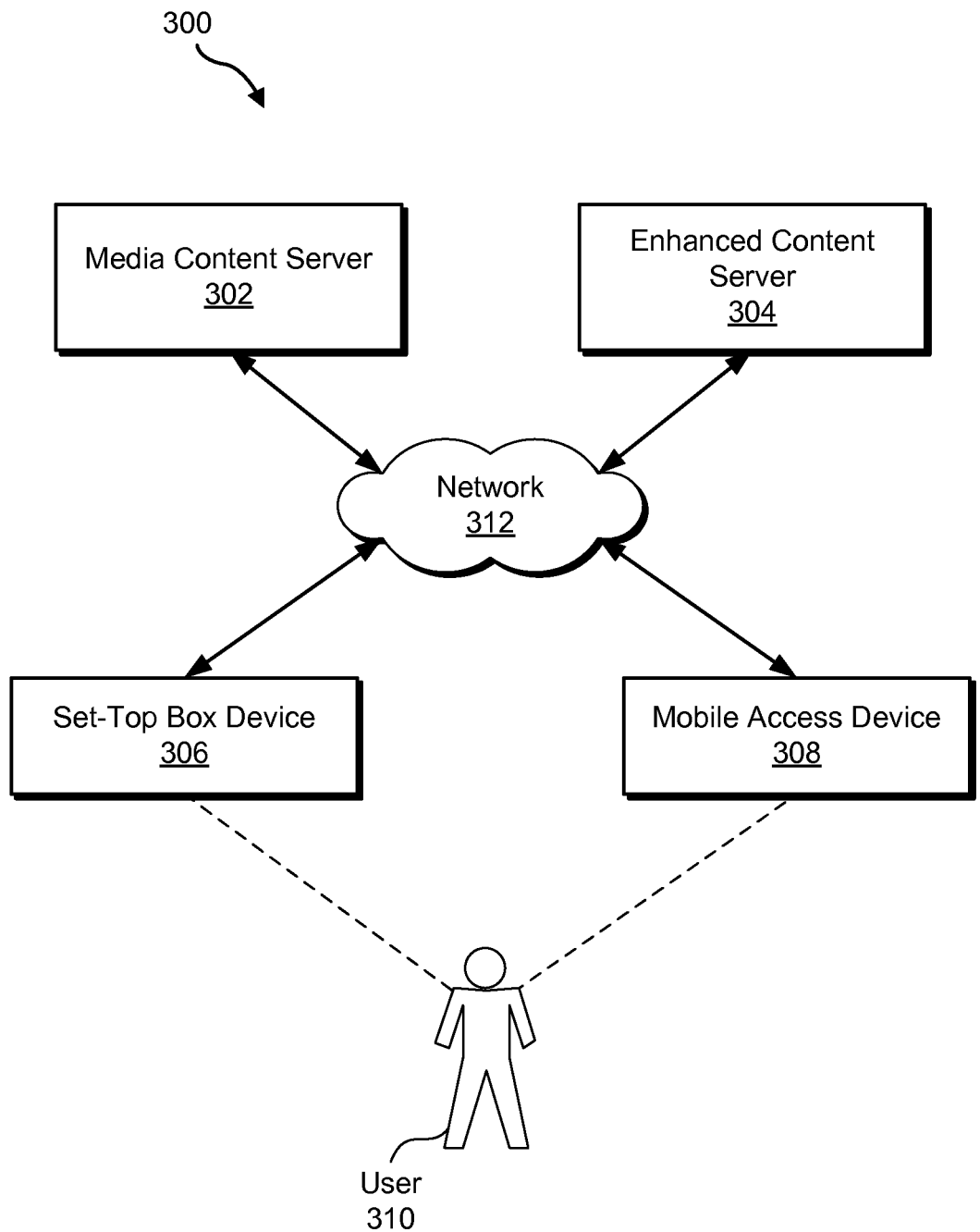
FIG. 3 illustrates another exemplary implementation of the system of FIG. 1 according to principles described herein.

To illustrate, FIG. 3 shows another exemplary implementation 300 of system 100 wherein provider subsystem 202 is implemented by a media content server 302 and an enhanced content server 304, and access subsystem 204 is implemented by a set-top box device 306 (or simply "STB device 306") and a mobile access device 308. Both STB device 306 and mobile access device 308 may be associated with (e.g., used by) a user 310. Implementation 300 may additionally or alternatively include any other type of server and/or access device as may serve a particular implementation.

In some examples, media content server 302 may be configured to maintain and/or provide media content and/or a stream of text associated with the media content to STB device 306 and/or mobile access device 308. Enhanced content server 304 may include or provide access to one or more enhanced content sources, such as the enhanced content sources described herein. Media content server 302, enhanced content server 304, set-top box device 306, and mobile access device 308 may be configured to communicate by way of a network 312, which may include one or more of the networks described herein. In this manner, as will be described in more detail below, media content server 302 may provide a media content instance for presentation to user 310 by way of STB device 306. Enhanced content server 304 may concurrently provide enhanced content associated with the media content instance to user 310 by way of mobile access device 308.

Figure 4:
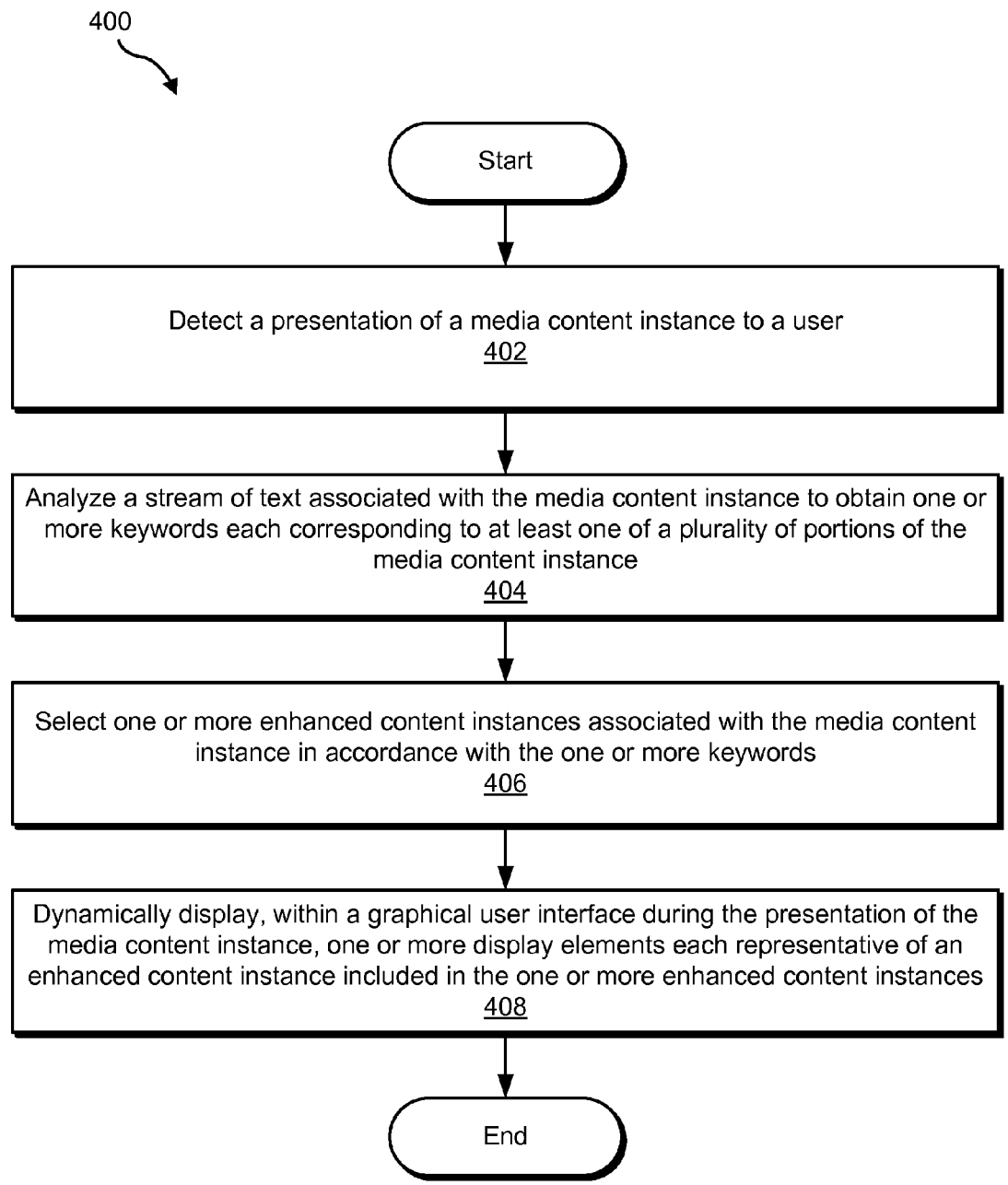
FIG. 4 illustrates an exemplary method of dynamically providing access to enhanced content during a presentation of a media content instance according to principles described herein.

FIG. 4 illustrates an exemplary method 400 of dynamically providing access to enhanced content during a presentation of a media content instance. While FIG. 4 illustrates exemplary steps according to one embodiment, other embodiments may omit, add to, reorder, and/or modify any of the steps shown in FIG. 4. One or more of the steps shown in FIG. 4 may be performed by any component or combination of components of system 100.

In step 402, an enhanced content access system detects a presentation of a media content instance. For example, detection facility 102 may be configured to detect a presentation of a media content instance for experiencing by a user in any suitable manner, such as described herein. To illustrate, detection facility 102 may be configured to detect a presentation of a media content instance to user 310 by STB device 306.

In step 404, the enhanced content access system analyzes a stream of text associated with the media content instance to obtain one or more keywords. In some examples, each of the one or more keywords may correspond to at least one of a plurality of portions of the media content instance. Text analysis facility 104 may be configured to receive and analyze the stream of text to obtain the one or more keywords in any suitable manner, such as described herein. For example, text analysis facility 104 may be configured to receive a stream of text from media content server 302 or STB device 306 associated with a media content instance being presented by STB device 306 (e.g., a closed caption stream associated with the media content instance) and analyze the stream of text to obtain one or more keywords associated with the media content instance.

Figure 5:
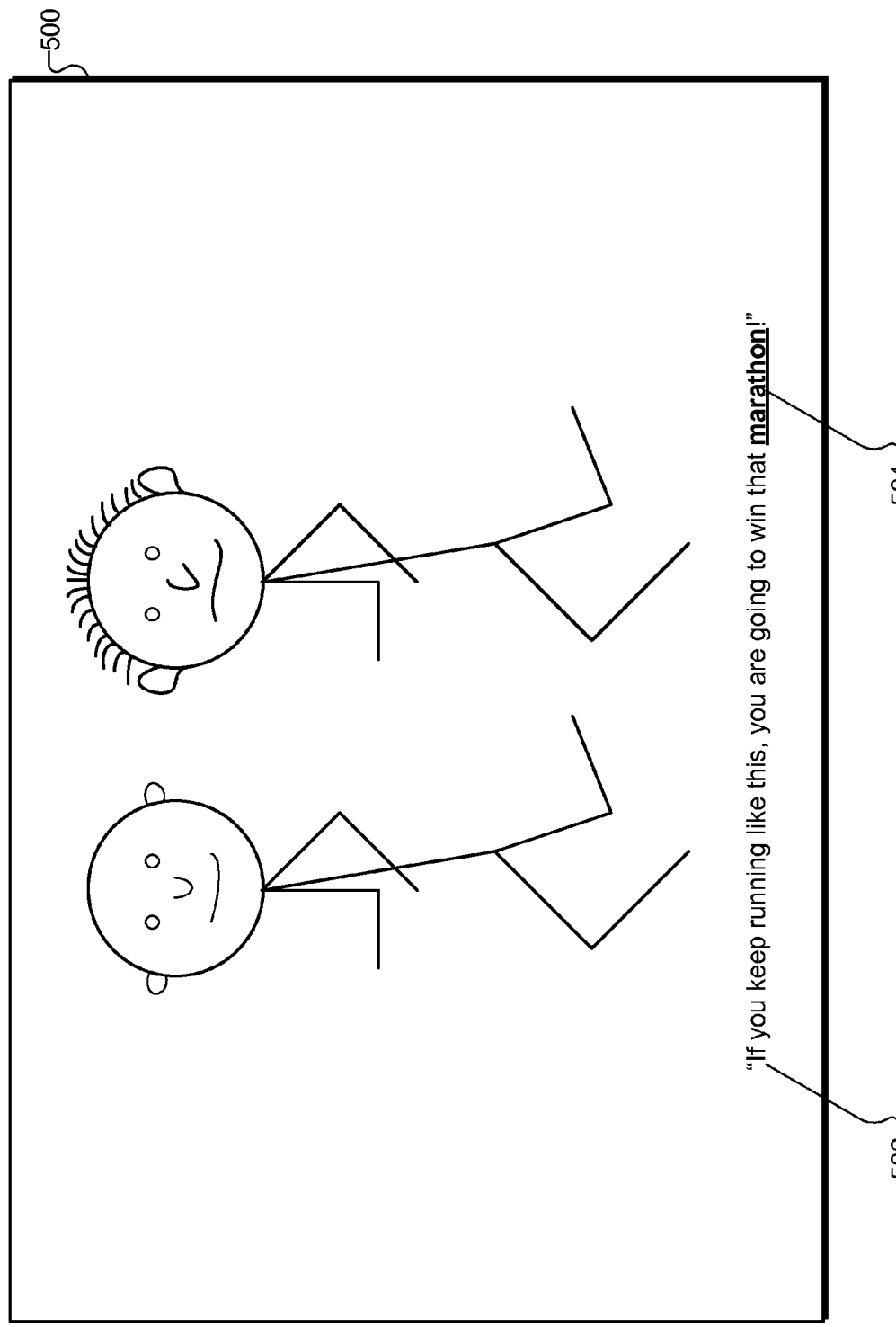
FIG. 5 illustrates an exemplary presentation of a first portion of a media content instance according to principles described herein.

To illustrate the foregoing steps of method 400, FIG. 5 shows an exemplary presentation of a first portion 500 of an exemplary media content instance. In some examples, detection facility 102 may be configured to detect the presentation of first portion 500 of the media content instance in any suitable manner. For example, detection facility 102 may be configured to receive a signal from STB device 306 or media content server 302 generally indicating that the media content instance is being presented by STB device 306 to user 310 and/or specifically indicating that first portion 500 of the media content instance is being presented to user 310.

First portion 500 may include one or more video portions and/or one or more audio portions of the media content instance. For example, first portion 500 may include a video portion showing two characters running and an audio portion including the two characters speaking to each other as well as other sounds (e.g., ambient sounds, etc.).

In some examples, first portion 500 may be associated with a stream of text 502. For example, stream of text 502 may represent a portion of a closed caption stream associated with the media content instance. Although FIG. 5 shows stream of text 502 being displayed in conjunction with the media content instance, one will appreciate that stream of text 502 need not be displayed in order to perform the processes and/or methods described herein. As shown, stream of text 502 may include a transcription of an audio portion of first portion 500. Specifically, stream of text 502 may include a transcription of one character saying, "If you keep running like this, you're going to win that marathon!" to the other character.

Text analysis facility 104 may be configured to analyze stream of text 502 to obtain one or more keywords associated with first portion 500. For example, text analysis facility 104 may be configured to remove one or more words from stream of text 502 to obtain a first keyword 504 associated with first portion 500. As shown, first keyword 504 includes the word "marathon." In additional or alternative examples, text analysis facility 104 may be configured to obtain one or more additional and/or alternative keywords from stream of text 502.

Returning to FIG. 4, in step 406, the enhanced content access system selects one or more enhanced content instances associated with the media content instance in accordance with the one or more keywords. For example, management facility 106 may be configured to select the one or more enhanced content instances in accordance with one or more keywords obtained by text analysis facility 104. To illustrate, management facility 106 may be configured to select one or more enhanced content instances associated with first portion 500 and in accordance with first keyword 504 shown in FIG. 5. Management facility 106 may be configured to select the one or more enhanced content instances in accordance with first keyword 504 in any suitable manner, such as described herein. For example, management facility 106 may be configured to search enhanced content server 304 for one or more enhanced content instances associated with the word "marathon."

Returning again to FIG. 4, in step 408, the enhanced content access system dynamically displays one or more display elements each representative of an enhanced content instance included in the one or more enhanced content instances. In some examples, the one or more display elements may be displayed within a graphical user interface during the presentation of the media content instance. For example, management facility 106 may be configured to display the one or more display elements within a graphical user interface in any suitable manner.

Figure 6:
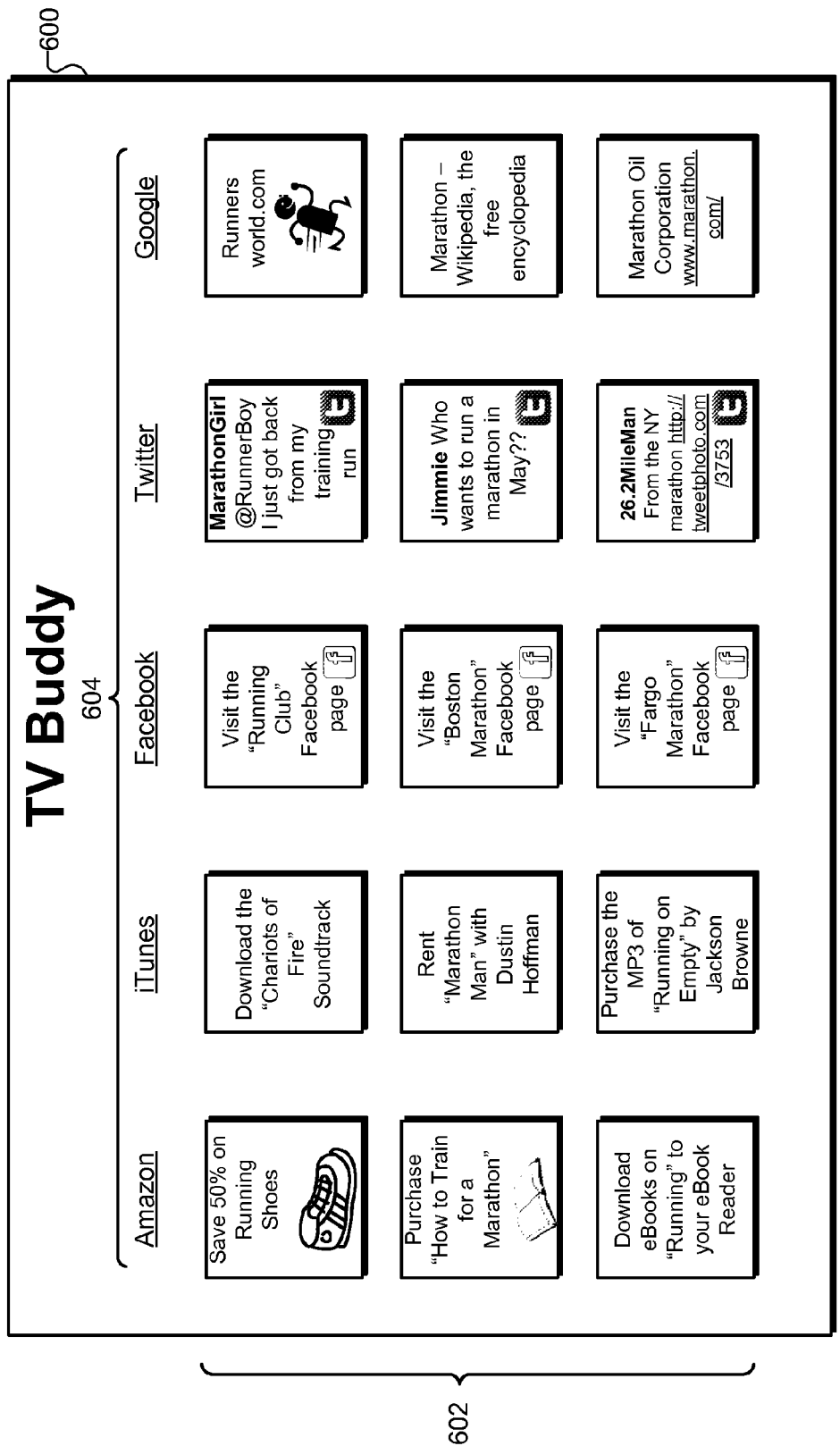
FIG. 6 illustrates an exemplary graphical user interface ("GUI") within which one or more display elements may be displayed during a time period associated with the presentation of the first portion of the media content instance of FIG. 5 according to principles described herein.

FIG. 6 illustrates an exemplary graphical user interface ("GUI") 600 that may be generated and/or displayed by management facility 106. For example, management facility 106 may be configured to utilize mobile access device 308 to display GUI 600 (e.g., on a display associated with mobile access device 308) during a time period associated with the presentation of first portion 500 by STB device 306. As a result, for example, user 310 may be able to experience first portion 500 and, concurrently therewith or shortly thereafter, experience enhanced content associated with first portion 500 by way of GUI 600.

As shown, management facility 106 may be configured to display a plurality of display elements 602 within GUI 600. Display elements 602 may be representative of enhanced content instances selected by management facility 106 and/or associated with first portion 500 of the media content instance. For example, one or more of display elements 602 may be representative of one or more enhanced content instances selected by management facility 106 in accordance with first keyword 504. Display elements 602 may include any suitable content, such as described herein.

As shown, management facility 106 may be configured to organize display elements 602 into a plurality of columns 604. In some examples, each column 604 may be associated with a particular enhanced content source or a particular enhanced content category. To illustrate, columns 604 include columns associated with enhanced content sources known as Amazon, iTunes, Facebook, Twitter, and Google. In additional or alternative examples, columns 604 may include columns associated with any other suitable enhanced content sources and/or enhanced content categories. GUI 600 includes fifteen display elements 602 organized into five columns 604 for illustrative purposes only. In additional or alternative embodiments, GUI 600 may include any suitable number of display elements 602 organized into any suitable number of columns 604.

Additionally or alternatively, display elements 602 may be selectable. For example, a user may select one of display elements 602 to access a corresponding enhanced content instance, as will be explained in more detail below.

Figure 7:
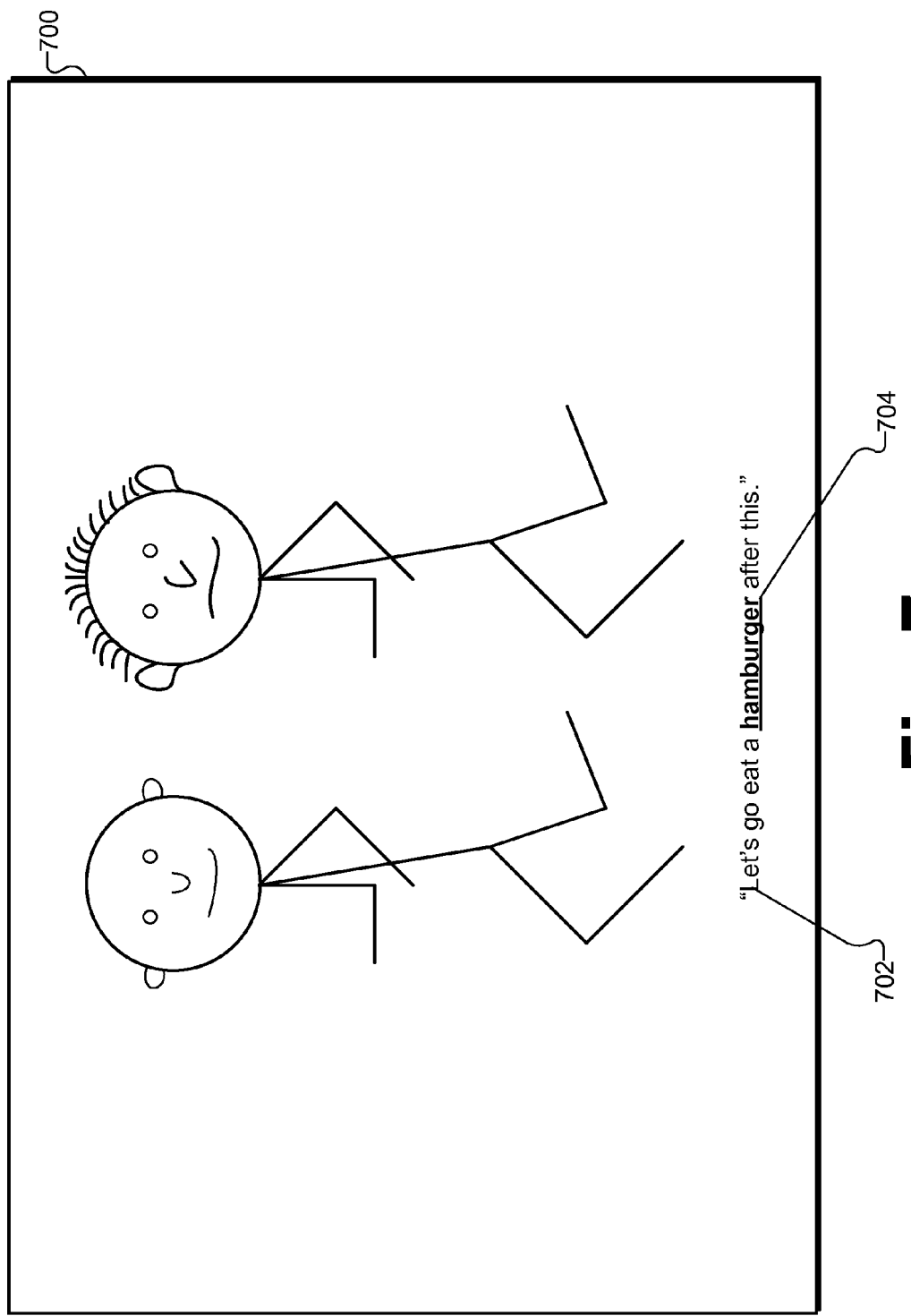
FIG. 7 illustrates an exemplary presentation of a second portion of the media content instance of FIG. 5 according to principles described herein.

In some examples, management facility 106 may be configured to update GUI 600 in accordance with the presentation of another portion of the media content instance being presented. For example, FIG. 7 illustrates a presentation of a second portion 700 of the media content instance being presented in FIG. 5. As shown, second portion 700 may include a video portion showing the two characters continuing to run and an audio portion including the two characters continuing to speak to each other.

Second portion 700 may be associated with another stream of text 702 (e.g., another portion of a closed caption stream associated with the media content instance). Specifically, stream of text 702 may include a transcription of a character saying, "Let's go eat a hamburger after this."

In some examples, text analysis facility 104 may be configured to analyze stream of text 702 to obtain a second keyword 704 associated with second portion 700 of the media content instance. For example, text analysis facility 104 may be configured to remove one or more words from stream of text 702 to obtain second keyword 704. As shown, second keyword 704 includes the word "hamburger."

Management facility 106 may be configured to select one or more enhanced content instances in accordance with second keyword 704. For example, management facility 106 may be configured to search enhanced content server 304 for enhanced content instances associated with the word "hamburger." Thereafter, management facility 106 may be configured to replace one or more of display elements 602 of GUI 600 with display elements representative of the enhanced content instances selected in accordance with second keyword 704.

Figure 8:
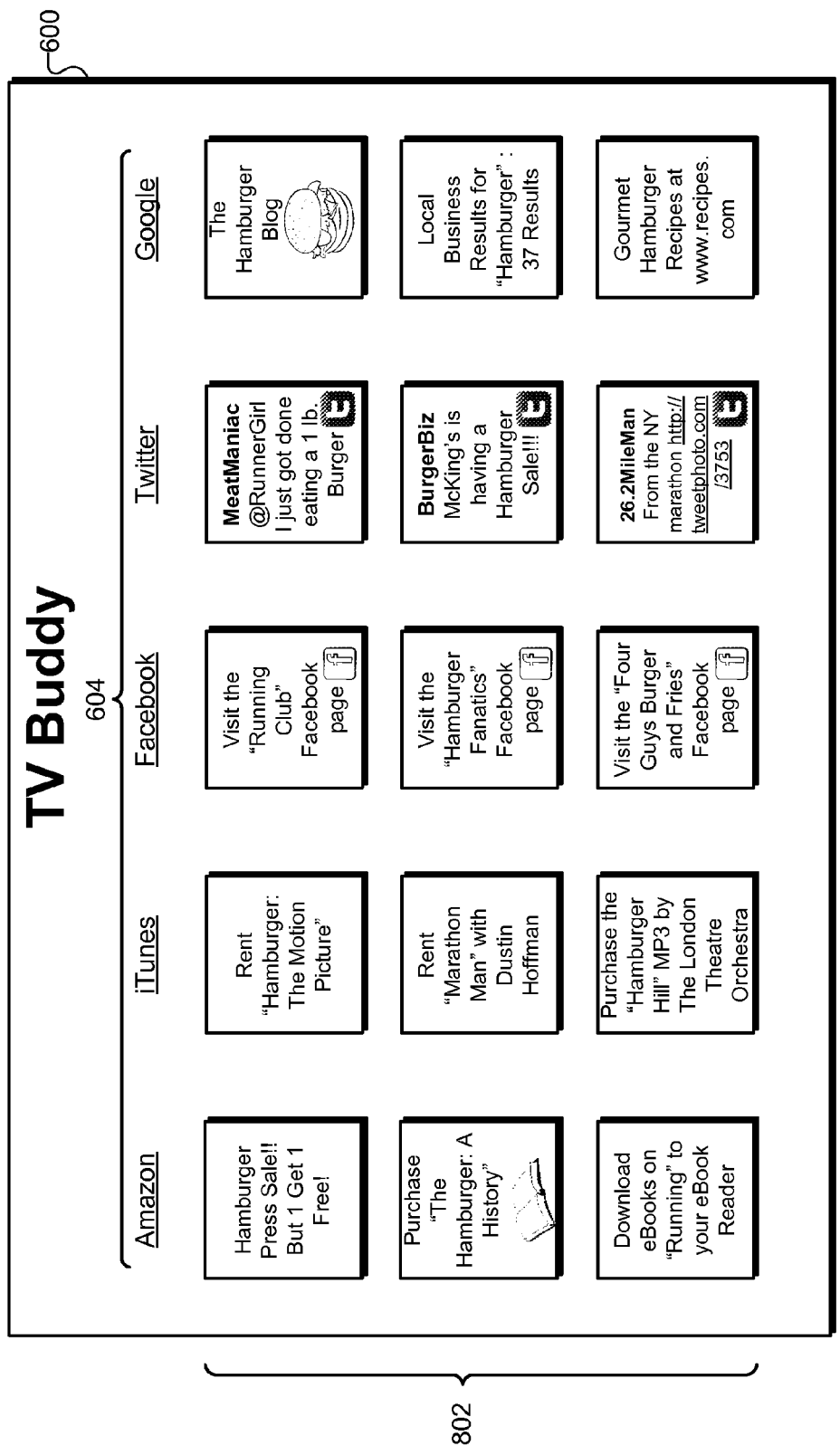
FIG. 8 illustrates the exemplary GUI of FIG. 6 after one or more display elements within the exemplary GUI have been replaced by new display elements according to principles described herein.

To illustrate, FIG. 8 shows GUI 600 including updated display elements 802 after management facility 106 has replaced one or more of display elements 602 (as shown in FIG. 6) with new display elements representative of the new enhanced content instances selected in accordance with second keyword 704. Management facility 106 may be configured to replace any suitable number of display elements 602 in any suitable order to generate updated display elements 802.

Updated display elements 802 may be displayed in accordance with the presentation of second portion 700 of the media content instance. For example, updated display elements 802 may be displayed during a time period associated with the presentation of second portion 700. In some examples, updated display elements 802 may be displayed during the presentation of second portion 700 and/or for an amount of time after the presentation of second portion 700 (e.g., for a predetermined amount of time after the presentation of second portion 700 or until updated displayed elements 802 are replaced with other display elements). Additionally or alternatively, the time period associated with the presentation of second portion 700 may at least partially overlap with or follow a completion of the time period associated with the presentation of first portion 500

Figure 9:
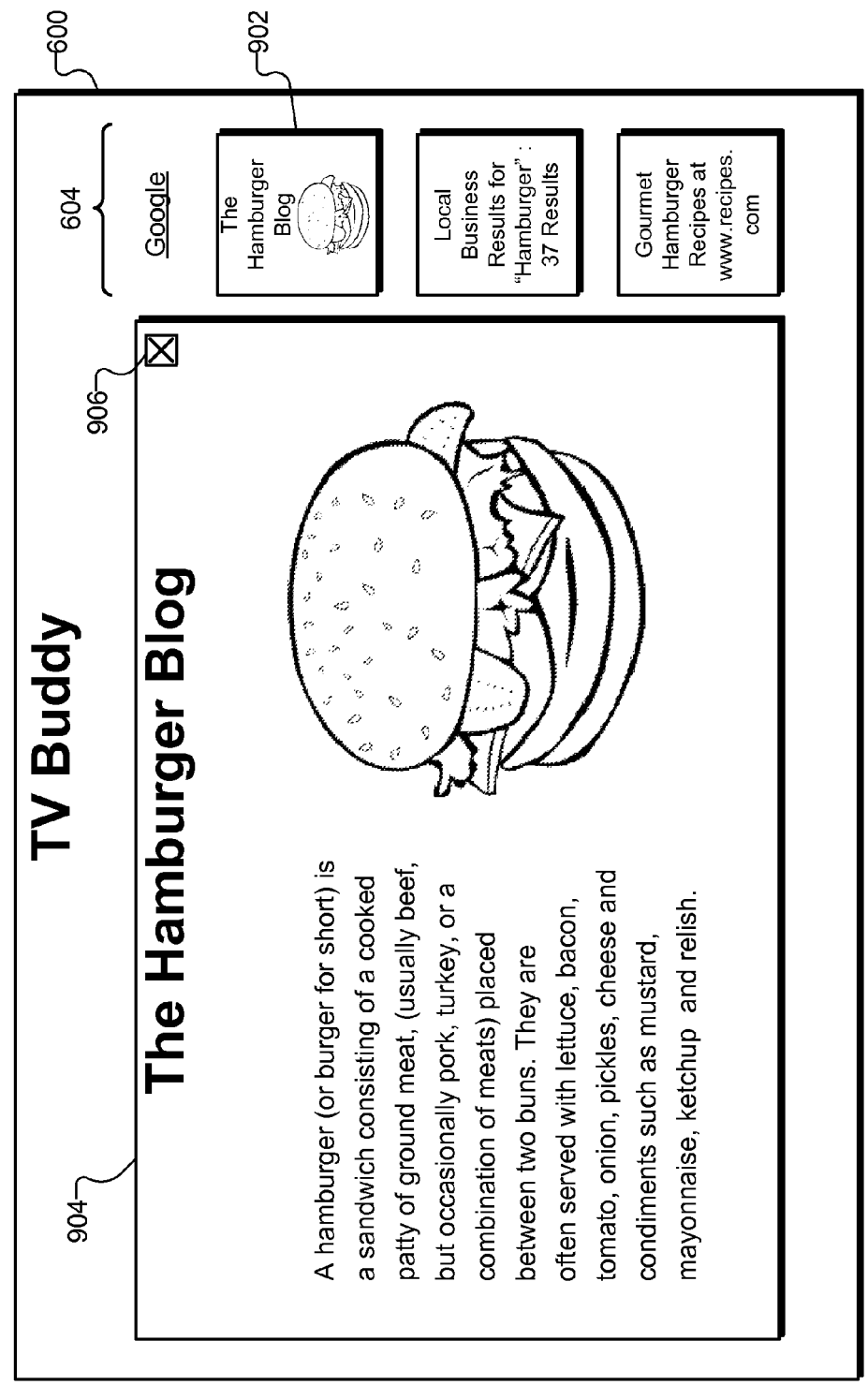
FIG. 9 illustrates the exemplary GUI of FIG. 8 after a user has selected one of the one or more display elements according to principles described herein.

As mentioned above, GUI 600 may be configured to allow a user to select a display element to access the corresponding enhanced content instance. To illustrate, FIG. 9 shows GUI 600 after a user has selected a particular display element 902. As shown, GUI 600 may include and/or display an enhanced content instance 904 (e.g., a blog entitled "The Hamburger Blog") of which display element 902 is representative. Accordingly, the user can access and interact with enhanced content instance 904 within GUI 600 during the presentation of the media content instance.

As shown, one or more of columns 604 may be hidden and/or minimized while enhanced content instance 904 is displayed. In some examples, the column 604 including the selected display element (e.g., display element 902) may remain visible to the user while enhanced content instance 904 is displayed. GUI 600 may also include a selectable option 906 configured to allow the user to close enhanced content instance 904 and continue browsing GUI 600 for additional display elements.

Although method 400 illustrated in FIG. 4 is explained in accordance with two portions of a media content instance, one will appreciate that one or more of steps 402-408 of method 400 may be repeated any suitable number of times during the presentation of a media content instance in order to dynamically provide a user with access to enhanced content associated with the media content instance being experienced by the user.

Figure 10:
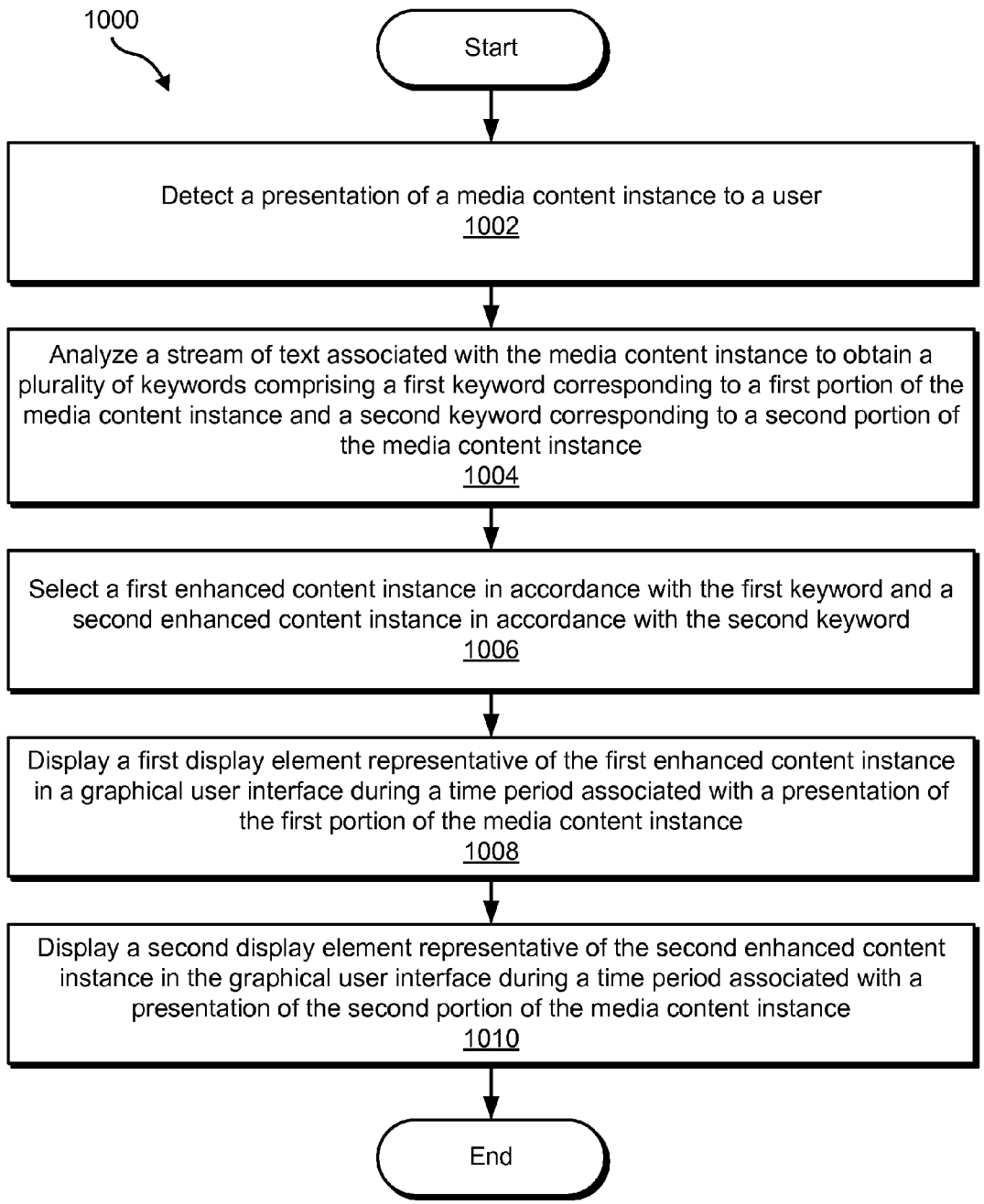
FIG. 10 illustrates another exemplary method of dynamically providing access to enhanced content during a presentation of a media content instance according to principles described herein.

FIG. 10 illustrates another exemplary method 1000 of dynamically providing access to enhanced content during a presentation of a media content instance. While FIG. 10 illustrates exemplary steps according to one embodiment, other embodiments may omit, add to, reorder, and/or modify any of the steps shown in FIG. 10. One or more of the steps shown in FIG. 10 may be performed by any component or combination of components of system 100.

In step 1002, an enhanced content access system detects a presentation of a media content instance. The presentation of the media content instance may be detected in any suitable manner, such as described herein.

In step 1004, the enhanced content access system analyzes a stream of text associated with the media content instance to obtain a plurality of keywords corresponding to the media content instance. In some examples, the plurality of keywords includes a first keyword corresponding to a first portion of the media content instance and a second keyword corresponding to a second portion of the media content instance. The stream of text may be analyzed and the plurality of keywords may be obtained in any suitable manner, such as described herein.

In step 1006, the enhanced content access system selects a first enhanced content instance in accordance with the first keyword and a second enhanced content instance in accordance with the second keyword. The first and second enhanced content instances may be selected in any suitable manner, such as described herein.

In step 1008, the enhanced content access system displays a first display element representative of the first enhanced content instance in a graphical user interface during a time period associated with a presentation of the first portion of the media content instance. The first display element may be displayed in any suitable manner, such as described here.

In step 1010, the enhanced content access system displays a second display element representative of the second enhanced content instance in the graphical user interface during a time period associated with the presentation of the second portion of the media content instance. The second display element may be displayed in any suitable manner, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
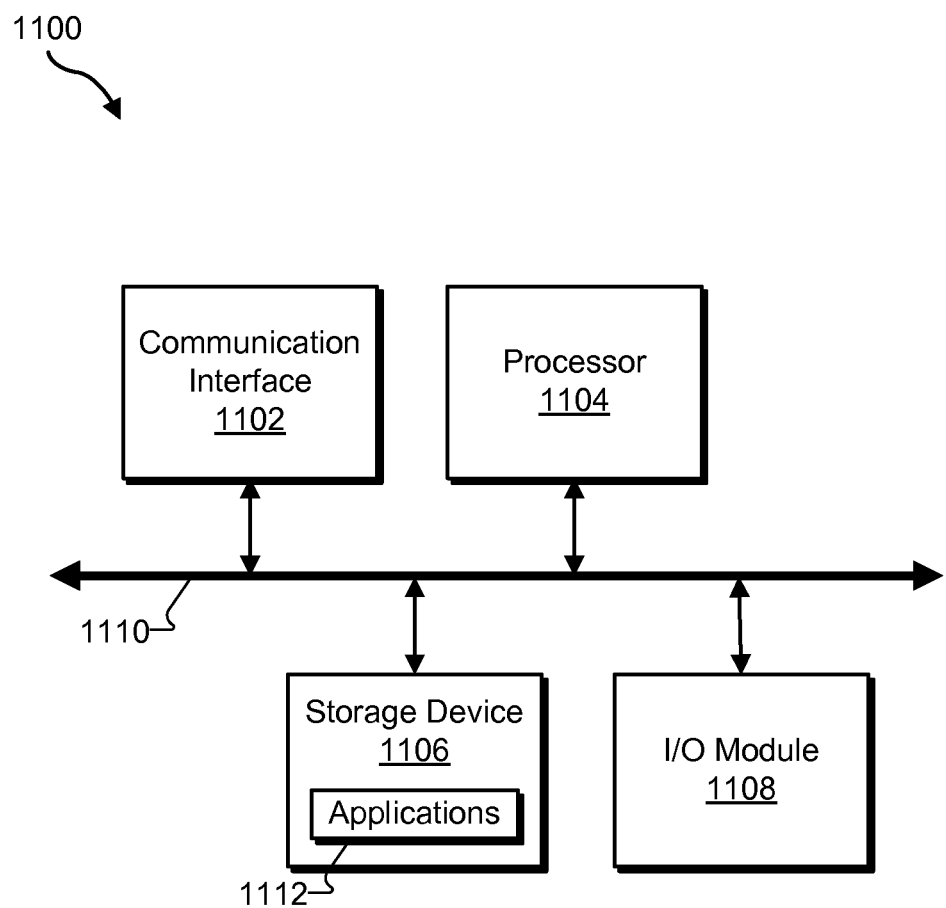
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. In at least one embodiment, communication interface 1102 may provide a direct connection between system 100 and one or more provisioning systems via a direct link to a network, such as the Internet. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 102, text analysis facility 104, and/or management facility 106. Likewise, storage facility 108 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A computer-implemented method comprising:
    detecting, by an enhanced content access system, a presentation of a media content instance and a stream of text associated with the media content instance;
    receiving, by the enhanced content access system, a selection by a user of
        one or more text analysis user preferences for analyzing the stream of text to obtain one or more keywords, and
        one or more enhanced content source user preferences that specify one or more enhanced content sources;
    detecting, by the enhanced content access system, the selection by the user of the one or more text analysis user preferences and the one or more enhanced content source user preferences;
    analyzing, by the enhanced content access system in accordance with the one or more text analysis user preferences, the stream of text to obtain the one or more keywords, each of the one or more keywords corresponding to at least one of a plurality of portions of the media content instance;
    selecting, by the enhanced content access system in accordance with the one or more keywords and the one or more enhanced content source user preferences, one or more enhanced content instances associated with the media content instance and provided by the specified one or more enhanced content sources; and
    dynamically displaying, by the enhanced content access system during the presentation of the media content instance, one or more display elements each representative of an enhanced content instance included in the one or more enhanced content instances in a graphical user interface on a display separate from a display used to present the media content instance.

2. The method of claim 1, wherein the stream of text comprises a closed caption stream.

3. The method of claim 1, wherein the analyzing the stream of text to obtain the one or more keywords comprises removing one or more noise words from the text to obtain the one or more keywords.

4. The method of claim 1, wherein the one or more enhanced content sources comprise at least one of a social media source, a media content source, a retail product source, a news source, an advertisement source, and an Internet search engine.

5. The method of claim 1, wherein the one or more display elements are organized into one or more columns of the graphical user interface.

6. The method of claim 5, wherein each column included in the one or more columns is associated with a particular enhanced content source or a particular enhanced content category.

7. The method of claim 1, wherein:
the one or more enhanced content instances comprise a first enhanced content instance selected in accordance with a first keyword included in the one or more keywords and the one or more enhanced content source user preferences and a second enhanced content instance selected in accordance with a second keyword included in the one or more keywords and the one or more enhanced content source user preferences, the first keyword corresponding to a first portion included in the plurality of portions of the media content instance and the second keyword corresponding to a second portion included in the plurality of portions of the media content instance;
the one or more display elements comprise at least a first display element representative of the first enhanced content instance and a second display element representative of the second enhanced content instance; and
the dynamically displaying comprises displaying the first display element in the graphical user interface during a first time period associated with a presentation of the first portion of the media content instance and displaying the second display element in the graphical user interface during a second time period associated with a presentation of the second portion of the media content instance.

8. The method of claim 7, wherein the first and second time periods at least partially overlap.

9. The method of claim 7, wherein the second time period follows a completion of the first time period, and wherein the dynamically displaying further comprises replacing the first display element with the second display element in the graphical user interface.

10. The method of claim 1, wherein:
the display used to present the media content instance comprises a display associated with a set-top box device; and
the display separate from the display used to present the media content instance comprises a display associated with a separate mobile access device.

11. The method of claim 10, wherein the detecting the presentation of the media content instance comprises detecting, by the enhanced content access system, a presentation of the media content instance by the set-top box device.

12. The method of claim 10, further comprising:
receiving, by the enhanced content access system, a selection by the user of a display element included in the one or more display elements; and
displaying, by the enhanced content access system in response to the selection, an enhanced content instance included in the one or more enhanced content instances and corresponding to the at least one display element.

13. The method of claim 1, wherein at least one of the analyzing and the selecting is performed in real time during the presentation of the media content instance.

14. The method of claim 1, embodied as computer-executable instructions on at least one non-transitory computer-readable medium.

15. The method of claim 1, wherein the one or more text analysis user preferences for analyzing the stream of text associated with the media content instance include at least one of a user preference to obtain a particular type of keyword, a user preference to remove a particular type of keyword, and a user preference to obtain one or more keywords at a frequency specified by the user.

16. A computer-implemented method comprising:
detecting, by an enhanced content access system, a presentation of a media content instance and a stream of text associated with the media content instance;
receiving, by the enhanced content access system, a selection by a user of
one or more text analysis user preferences for analyzing the stream of text to obtain a plurality of keywords, and
one or more enhanced content source user preferences that specify one or more enhanced content sources;
detecting, by the enhanced content access system, the selection by the user of the one or more text analysis user preferences and the one or more enhanced content source user preferences;
analyzing, by the enhanced content access system in accordance with the one or more text analysis user preferences, the stream of text to obtain the plurality of keywords comprising a first keyword corresponding to a first portion of the media content instance and a second keyword corresponding to a second portion of the media content instance;
selecting, by the enhanced content access system in accordance with the first keyword and the one or more enhanced content source user preferences, a first enhanced content instance associated with the media content instance and provided by the specified one or more enhanced content sources;
selecting, by the enhanced content access system in accordance with the second keyword and the one or more enhanced content source user preferences, a second enhanced content instance associated with the media content instance and provided by the specified one or more enhanced content sources;
displaying, by the enhanced content access system, a first display element representative of the first enhanced content instance in a graphical user interface on a display separate from a display used to present the media content instance during a time period associated with a presentation of the first portion of the media content instance; and
displaying, by the enhanced content access system, a second display element representative of the second enhanced content instance in the graphical user interface on the display separate from the display used to present the media content instance during a time period associated with a presentation of the second portion of the media content instance.

17. The method of claim 16, wherein the first and second time periods at least partially overlap.

18. The method of claim 16, wherein the second time period follows a completion of the first time period.

19. The method of claim 16, wherein the displaying the second display element further comprises replacing the first display element with the second display element in the graphical user interface.

20. The method of claim 16, wherein the stream of text comprises a closed caption stream.

21. The method of claim 16, wherein at least one of the analyzing and the selecting the first and second enhanced content instances is performed in real time during the presentation of the media content instance.

22. The method of claim 16, wherein the analyzing the stream of text to obtain the plurality of keywords comprises removing one or more noise words from the stream of text to obtain the first keyword and the second keyword.

23. The method of claim 16, embodied as computer-executable instructions on at least one non-transitory computer-readable medium.

24. A computing system comprising:
a detection facility configured detect a presentation of a media content instance and a stream of text associated with the media content instance;
a text analysis facility communicatively coupled to the detection facility and configured to:
receive a selection by a user of one or more text analysis user preferences for analyzing the stream of text to obtain one or more keywords;
detect the selection by the user of the one or more text analysis user preferences; and
analyze the stream of text in accordance with the one or more text analysis user preferences to obtain the one or more keywords, each of the one or more keywords corresponding to at least one of a plurality of portions of the media content instance; and
an enhanced content management facility communicatively coupled to the text analysis facility and configured to:
receive a selection by the user of one or more enhanced content source user preferences that specify one or more enhanced content sources;
detect the selection by the user of the one or more enhanced content source user preferences;
select one or more enhanced content instances associated with the media content instance in accordance with the one or more keywords and the one or more enhanced content source user preferences; and
dynamically display one or more display elements each representative of an enhanced content instance included in the one or more enhanced content instances in a graphical user interface on a display separate from a display used to present the media content instance during the presentation of the media content instance.

25. The system of claim 24, wherein:
the one or more keywords comprises a first keyword corresponding to a first portion included in the plurality of portions of the media content instance and a second keyword corresponding to a second portion included in the plurality of portions of the media content instance;
the enhanced content management facility is further configured to select a first enhanced content instance in accordance with the first keyword and a second enhanced content instance in accordance with the second keyword;
the one or more display elements comprise a first display element representative of the first enhanced content instance and a second display element representative of the second enhanced content instance; and
the enhanced content management facility is further configured to display the first display element in the graphical user interface during a first time period associated with a presentation of the first portion of the media content instance and displaying the second display element in the graphical user interface during a second time period associated with a presentation of the second portion of the media content instance.

* * * * *